(12) United States Patent
Wei (10) Patent No.: US 9,257,683 B2
(45) Date of Patent: Feb. 9, 2016

(54) POWER BATTERY

(75) Inventor: Yincang Wei, Zhuhai (CN)

(73) Assignee: Zhuhai Yinlong Energy Co., Ltd. (CN)

( * ) Notice: Subject to any disclaimer, the term of this patent is extended or adjusted under 35 U.S.C. 154(b) by 906 days.

(21) Appl. No.: 13/376,922

(22) PCT Filed: Jul. 17, 2009

(86) PCT No.: PCT/CN2009/000803
§ 371 (c)(1),
(2), (4) Date: Dec. 8, 2011

(87) PCT Pub. No.: WO2010/142063
PCT Pub. Date: Dec. 16, 2010

(65) Prior Publication Data
US 2012/0082882 A1 Apr. 5, 2012

(30) Foreign Application Priority Data
Jun. 11, 2009 (CN) .......................... 2009 1 0040186

(51) Int. Cl.
| | |
|---|---|
| *H01M 10/60* | (2014.01) |
| *H01M 10/61* | (2014.01) |
| *H01M 10/613* | (2014.01) |
| *H01M 10/617* | (2014.01) |
| *H01M 2/02* | (2006.01) |
| *H01M 10/6551* | (2014.01) |
| *H01M 10/643* | (2014.01) |
| *H01M 10/6562* | (2014.01) |

(52) U.S. Cl.
CPC .............. *H01M 2/024* (2013.01); *H01M 2/022* (2013.01); *H01M 10/613* (2015.04); *H01M 10/643* (2015.04); *H01M 10/6551* (2015.04); *H01M 10/6562* (2015.04)

(58) Field of Classification Search
CPC . H01M 2/024; H01M 2/022; H01M 10/6551; H01M 10/643; H01M 10/613; H01M 10/6562
See application file for complete search history.

(56) References Cited

U.S. PATENT DOCUMENTS 5,288,564 A 2/1994 Klein et al.
2006/0216583 A1 * 9/2006 Lee et al. ...................... 429/120

FOREIGN PATENT DOCUMENTS

CN 1945890A A 4/2007
EP 0620610 A1 10/1994

\* cited by examiner

*Primary Examiner* — Helen O Conley
(74) *Attorney, Agent, or Firm* — Robert Plotkin, P.C.; Robert Plotkin (57) ABSTRACT

A power battery, the power battery includes an inner case (4), an outer case (1), a battery body (2) and electrodes (3), the battery body (2) includes electrode plates, the external surface of the outer case is provided with an external heat abstractor and the internal surface of the inner case is provided with an internal heat abstractor, a cylindrical holding cavity (5) with an annular cross section is formed between the outer case (1) and the inner case (4) and the electrode plates are rolled in the holding cavity (5), the electrodes (3) are arranged in an inner cavity of the inner case (4) and the inner case also has at least an airway going through the inner cavity.

6 Claims, 12 Drawing Sheets

POWER BATTERY

CROSS-REFERENCE TO RELATED APPLICATIONS

This application is a PCT National Stage entry of and claims priority from PCT Patent Application No. PCT/CN2009/000803, filed on Jul. 17, 2009, entitled, "Power Battery," which claims priority from Chinese Patent Application No. 200910040186.2, filed on Jun. 11, 2009, entitled, "Power Battery," both of which are hereby incorporated by reference herein.

TECHNICAL FIELD

The present invention relates to techniques of batteries, and more particularly, to a power battery.

BACKGROUND OF THE INVENTION

With the development of the world economy, the price of the international oil fluctuates violently in recent years, and the oil resource is anticipated to decrease in the future, so oil has already become a bottle neck of the development of the world economy, and making use of new energy sources has become a new trend in the development of economy. With the growing shortage of the global fossil energy and the increasing pollution of the environment, the demand for clean and renewable energy sources is growing more and more imperative.

As carriers of high efficient renewable energy sources, lithium ion batteries are widely used in electron and communication industry, especially in personal communication tools such as mobile phones, PDA and so on. Color screen technology, multimedia message technology, Bluetooth technology and photographing technique have been introduced one after another in recent two years with the rapid development of communication technology, which puts forward higher standard for the capacity, volume, weight, electrochemical performance and safety performance of lithium ion battery. The working voltage of a single lithium ion battery is usually ranged from 2.4 v to 4.5 v. What's more, the capacity of a single battery is limited.

The safety performance of the lithium ion battery is more important for the electric vehicles, UPS, communication equipments and so on in the application fields, of which large capacity and large power are needed. At present, the power battery with large capacity and large power is assembled by connecting single cells in series and/or in parallel. The key factor which affects the safety performance of the lithium ion battery is that the heat of the battery produced in the working process can't be released in time. Instead, the heat is accumulated gradually and becomes out of control to cause an explosion at last, which will bring harm and damages to the users. Now the lithium ion battery is solid, which is not good for eliminating heat. So for the people in this field, it has become one of the highlights of research whether the structure of a single lithium ion battery is beneficial to heat radiation and meets the requirements of unconformity of the battery or not.

The most common power batteries in the prior art are solid and in shape of circle or square. These two kinds of batteries have the same defects of low safety performance, less charge/discharge cycles and bad operational performances as follows:

The interior of the square battery is assembled by a number of electrode plates. In working process, the inner ions of the battery move at high speed and the temperature inside the battery rises. Due to the whole structure defects of the square battery, the square battery stops the internal heat from being released, so that the outer case of the power battery and the inner electrode plates distort, and the spaces between the inner electrode plates of the battery become unequal, which will affect the charging characteristics and discharging characteristics. What's more, that the internal heat can't be released will result in the instable performance, explosion and short service life of the battery.

The interior of the circular battery is assembled by rolling a number of electrode plates. In working process, the inner ions of the battery move at high speed and the temperature inside the battery rises. Due to the whole structure defects of the circular battery, the circular battery stops the internal heat from being released, so that the spaces between the inner electrode plates of the battery become unequal, which will affect the charging characteristics and discharging characteristics. What's more, that the internal heat can't be released will result in the instable performance, explosion and short service life of the battery.

Now it has become a common sense of governments of all countries and groups of enterprises to develop power batteries with large capacity, long service life and good safety performance. It is anticipated that this kind of power battery will be one of the most important power energy resources of electric vehicles in the 21st century and will be widely used in manmade satellites, aeronautics and space industry, and energy storage.

SUMMARY OF THE INVENTION

The present invention is aimed at providing a power battery with a new structure, high security, excellent heat elimination and long service life.

The object of the present invention is achieved by the following technical scheme:

A power battery comprises an outer case, a battery body and an electrode. The battery body comprises electrode plates. The power battery further comprises an inner case. An external heat abstractor is disposed on external surface of the outer case and an internal heat abstractor is disposed on internal surface of the inner case. A cylindrical holding cavity with an annular cross section is formed between the outer case and the inner case, and the electrode plates are rolled in the holding cavity. The electrode is disposed in an inner cavity of the inner case, which is provided with one or more airways going through the inner cavity.

Wall thickness of the outer case is greater than that of the inner case.

In summary, the present invention has following advantages:

The improved design of the power battery of the present invention is based on the traditional power battery with the defects of poor heat elimination, tending to explode, less cycles and long charging time. The power battery comprises the specific structure such as the shape, the inner cavity and so on. With respect to the power battery of the present invention, an external heat abstractor is disposed on the external surface of the outer case, an internal heat abstractor is disposed on the internal surface of the inner case, and the inner case is provided with one or more airways going through the inner cavity, which is good for the power battery to release the heat accumulated in working process in time and makes the power battery safer in use. What's more, in the operating environment in which a large quantity of heat needs releasing, a ventilator, an air conditioner and other refrigerators or radiators may be installed in the inner cavity of the power battery. The power battery with such structure can keep working in proper temperature of the environment, can reduce the demand for the uniformity of the power battery and prolong the cycle life of the power battery. Additionally, with respect to the power battery of the present invention, the wall thickness of the outer case is greater than that of the inner case, so when the temperature and the pressure in the power battery rise steeply, the inner case breaks first and the steam is ejected directionally from two ends of the airway, and accidents can be avoided as long as proper ejection directions are set.

DETAILED DESCRIPTION OF THE PREFERRED EMBODIMENTS

The power battery disclosed in the present invention comprises an outer case, a battery body and an electrode. The battery body comprises electrode plates. The power battery further comprises an inner case. An external heat abstractor is disposed on the external surface of the outer case and an internal heat abstractor is disposed on the internal surface of the inner case. A cylindrical holding cavity with an annular cross section is formed between the outer case and the inner case. The electrode plates are rolled in the holding cavity. The electrode is disposed in an inner cavity of the inner case, which is provided with one or more airways going through the inner cavity.

Wall thickness of the outer case is greater than that of the inner case.

The power battery has various shapes such as circle, square, rhomb or cylinder. The inner cavity is circular, honeycomb-like, square or quincuncial in shape. The present invention will be described in more details as follows.

The First Embodiment

As shown in FIGS. 1, 2, 3 and 4, according to the power battery of this embodiment, the outer case 1 and the inner case 4 are nested together to form a tubular structure. The external heat abstractor is made up of multiple external radiator fins 11 which extend outwards in directions of diameters of the outer case 1. The multiple external radiator fins 11 are fixed on external surface of the outer case 1 and spaced at a specific distance. The holding cavity 5 has a cylindrical structure with an annular cross section. The electrode plates 21 of the battery body 2 are rolled to form overlapped and sliced cylinders. The internal heat abstractor is made up of multiple internal radiator fins 41 which extend inwards in directions of diameters of the inner case 4. The multiple internal radiator fins 41 are fixed on internal surface of the inner case 4 and spaced at a specific distance. The inner cavity is provided with an airway 71, which has a gear-like cross section and may go through the inner cavity.

The electrode 3 comprises a first electrode member 31 and a second electrode member 32 which are located at upper end and lower end of the inner cavity respectively. The first electrode member 31 comprises one or more electrode poles 311 and a connecting pipe 310 located in center of the inner cavity. The power battery disclosed in this embodiment is provided with 2 to 10 electrode poles 311, preferably three electrode poles 311. Each of the electrode poles 311 is connected with the internal surface of the inner case 4 at one end, and is connected with the connecting pipe 310 at the other end. The three electrode poles 311 are distributed evenly along a circum on the internal surface of the inner case 4, which makes the power battery be charged and discharge more evenly.

The second electrode member 32 has the same structure as the first electrode member 31. The first electrode member 31 and the second electrode member 32 are insulated from each other.

One or more sensors 6 are disposed inside the inner cavity to obtain information of the power battery. The sensors 6 may be temperature sensors and/or pressure sensors.

The wall thickness L of the outer case 1 is ranged from 0.5 mm to 500 mm. The wall thickness A of the inner case 4 is ranged from 0.2 mm to 15 mm.

The Second Embodiment

As shown in FIGS. 5, 6, 7 and 8, the power battery disclosed in the second embodiment differs from the first embodiment in that, the inner cavity is provided with an airway 72, which has a quincuncial cross section and may go through the inner cavity; and an irregular surface is formed on the internal surface of the inner case 4, which increases radiating area greatly.

The wall thickness L of the outer case 1 is ranged from 0.5 mm to 500 mm. The wall thickness B of the inner case 4 is ranged from 0.2 mm to 15 mm.

The Third Embodiment

As shown in FIGS. 9, 10, 11 and 12, the power battery disclosed in the third embodiment differs from the first embodiment in that, the inner cavity is provided with an airway 73, which has a honeycomb-like cross section and may go through the inner cavity; the airway 73 is composed of multiple small cylindrical honeycomb holes which are not interconnected; and wall thickness of each small honeycomb hole is ranged from 0.5 mm to 1.0 mm.

The wall thickness L of the outer case 1 is ranged from 0.5 mm to 500 mm. The wall thickness C of the inner case 4 is ranged from 0.2 mm to 15 mm.

The Fourth Embodiment

As shown in FIGS. 13, 14, 15 and 16, the power battery disclosed in the fourth embodiment differs from the first embodiment in that, the outer heat abstractor is made up of multiple square external radiator fins 12, which extend outwards in the directions of diameters of the outer case 1; the multiple square external radiator fins 12 are fixed on the external surface of the outer case 1 and spaced at a specific distance; outmost contours of the multiple square external radiator fins 12 are all located on surfaces of a cuboid or a cube; and the whole battery is cuboid or cube in shape.

Upper end plane of the power battery is provided with one to four upper connecting devices 81 located at four corners of the upper end plane. Lower end plane of the power battery is provided with one to four lower connecting devices 82 located at four corners of the lower end plane.

The Fifth Embodiment

Figure 1:
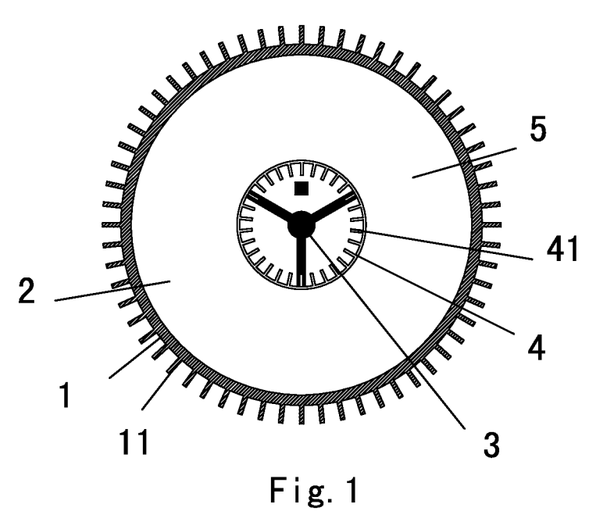
FIG. 1 is a vertical view illustrating the power battery of the present invention according to the first embodiment.
Figure 2:
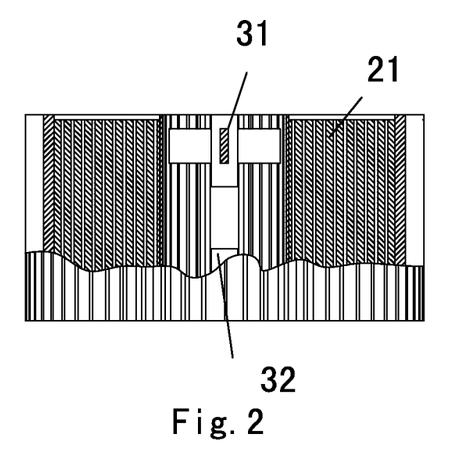
FIG. 2 is a sectional view illustrating the power battery of the present invention according to the first embodiment.
Figure 3:
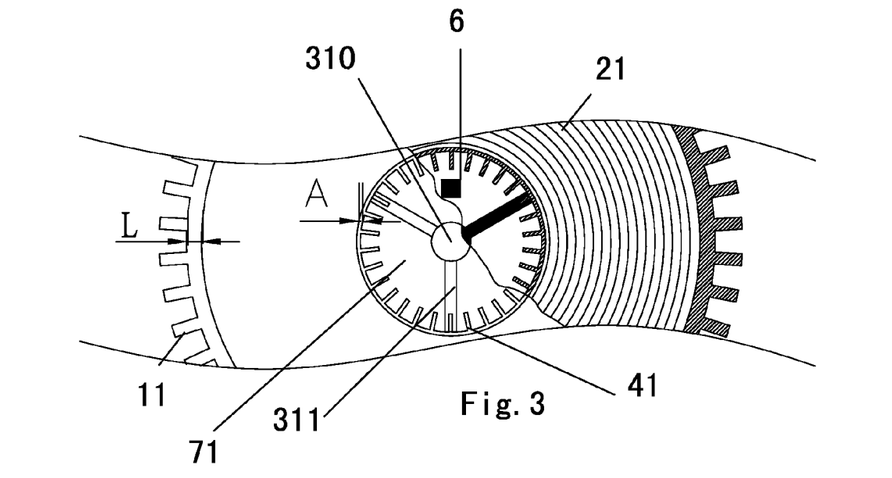
FIG. 3 is a vertical view illustrating the local inner cavity of the power battery of the present invention according to the first embodiment.
Figure 4:
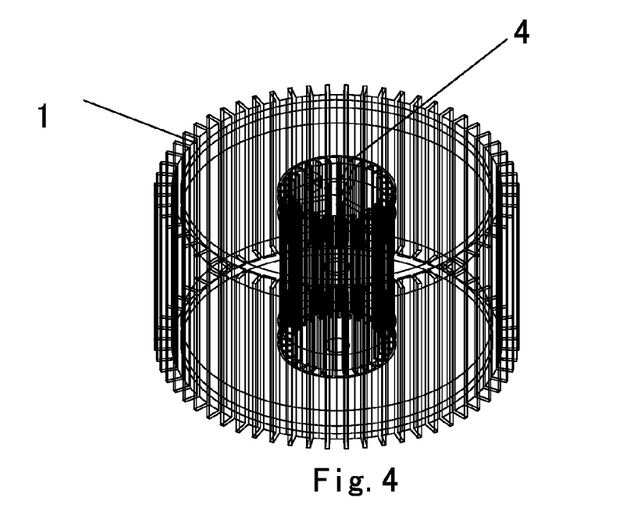
FIG. 4 is a stereogram illustrating the power battery of the present invention according to the first embodiment.
Figure 5:
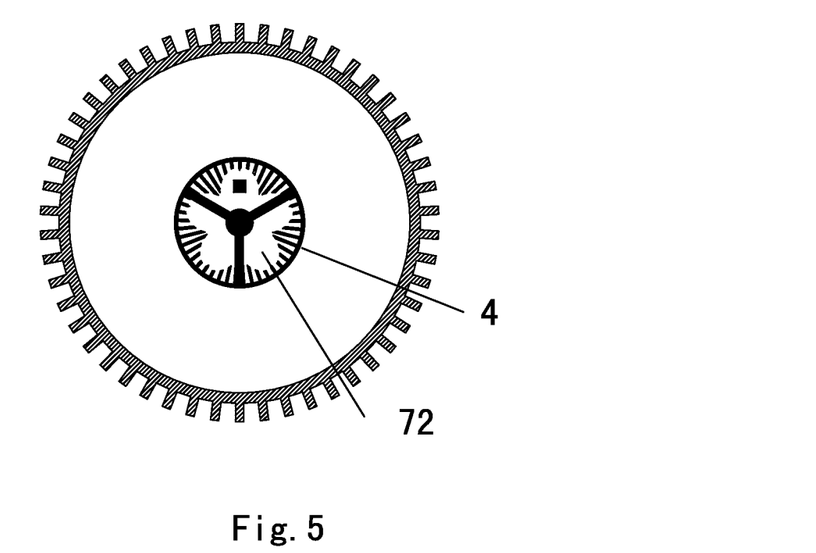
FIG. 5 is a vertical view illustrating the power battery of the present invention according to the second embodiment.
Figure 6:
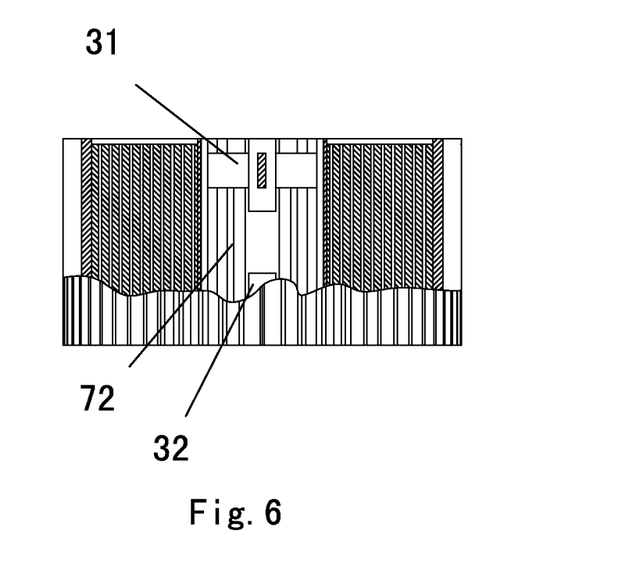
FIG. 6 is a sectional view illustrating the power battery of the present invention according to the second embodiment.
Figure 7:
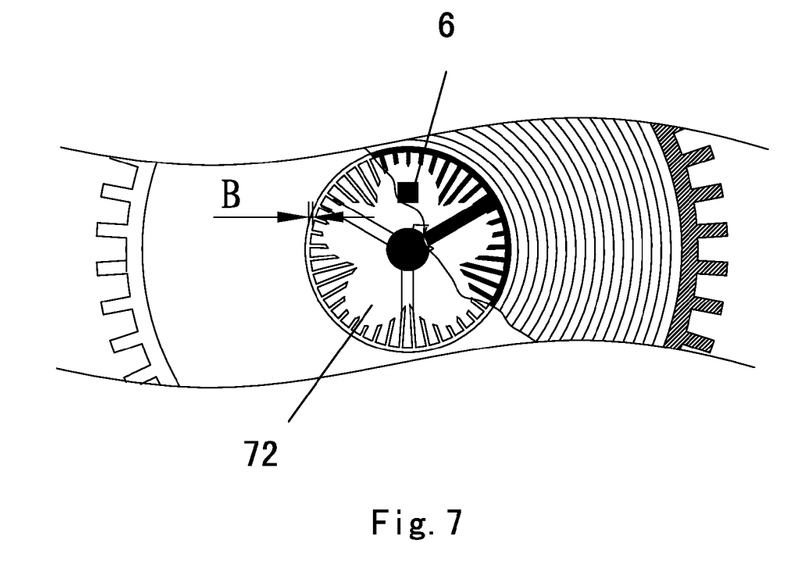
FIG. 7 is a vertical view illustrating the local inner cavity of the power battery of the present invention according to the second embodiment.
Figure 8:
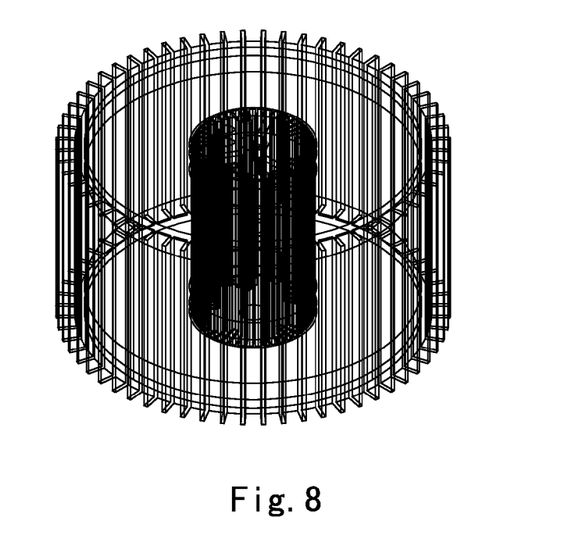
FIG. 8 is a stereogram illustrating the power battery of the present invention according to the second embodiment.
Figure 9:
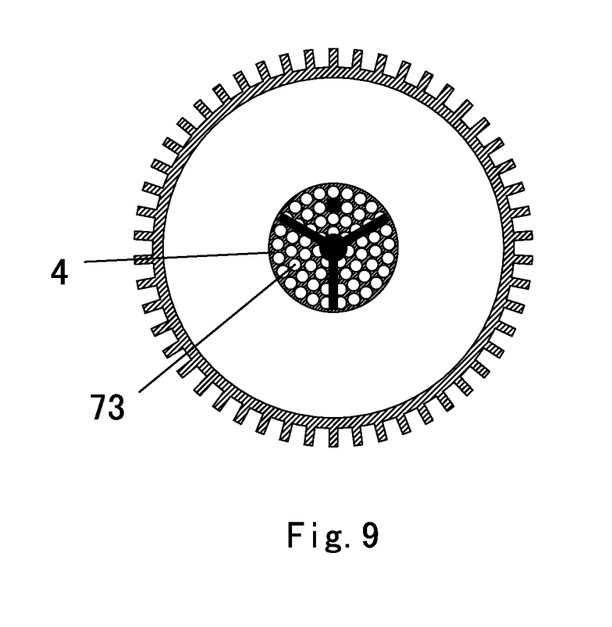
FIG. 9 is a vertical view illustrating the power battery of the present invention according to the third embodiment.
Figure 10:
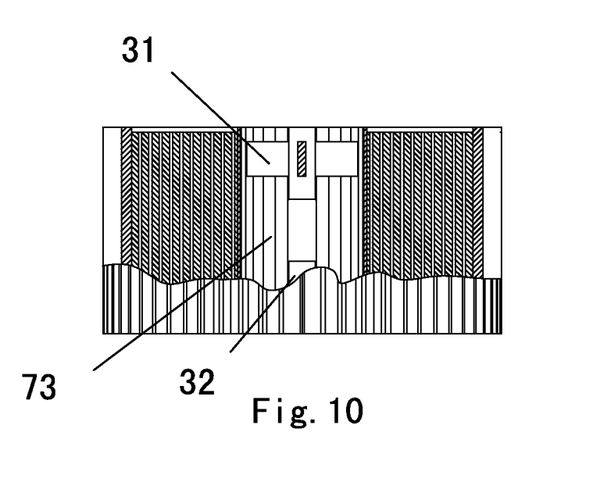
FIG. 10 is a sectional view illustrating the power battery of the present invention according to the third embodiment.
Figure 11:
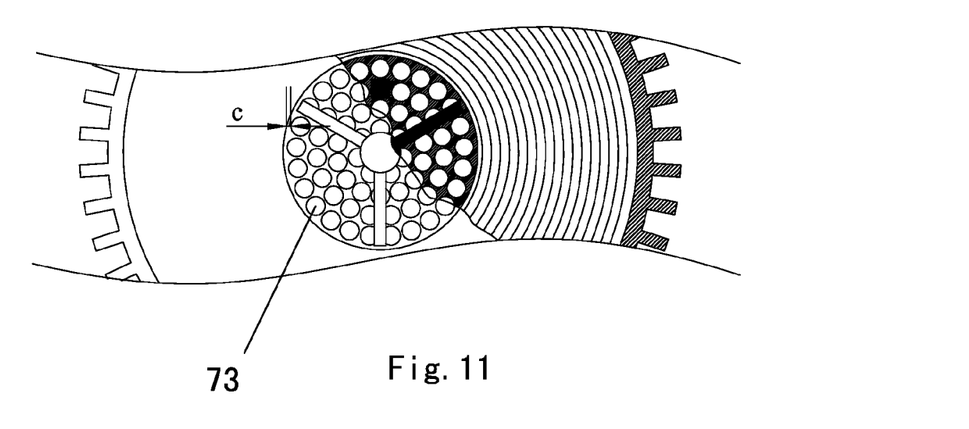
FIG. 11 is a vertical view illustrating the local inner cavity of the power battery of the present invention according to the third embodiment.
Figure 12:
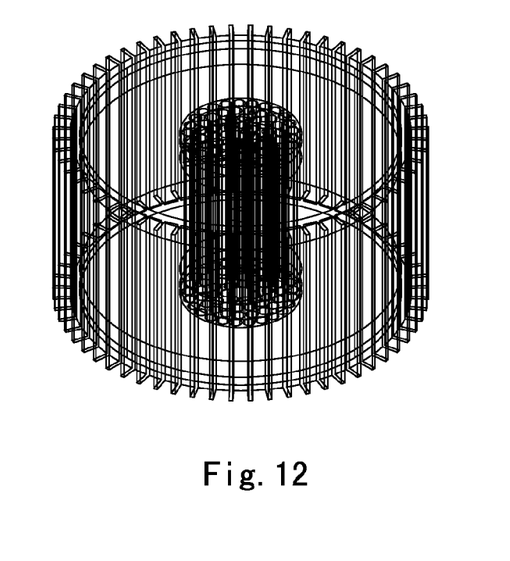
FIG. 12 is a stereogram illustrating the power battery of the present invention according to the third embodiment.
Figure 13:
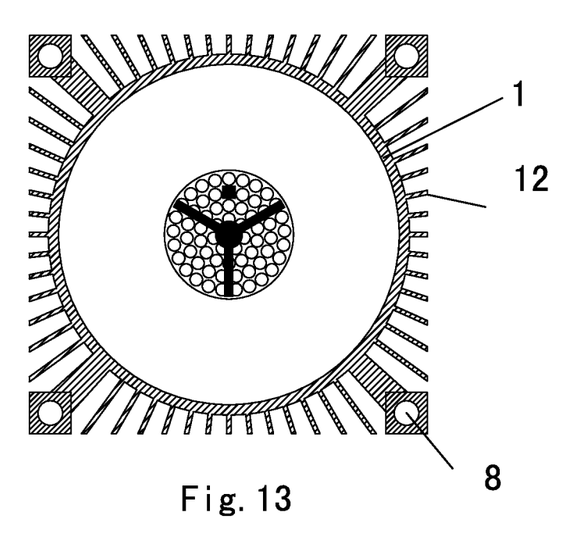
FIG. 13 is a vertical view illustrating the power battery of the present invention according to the fourth embodiment.
Figure 14:
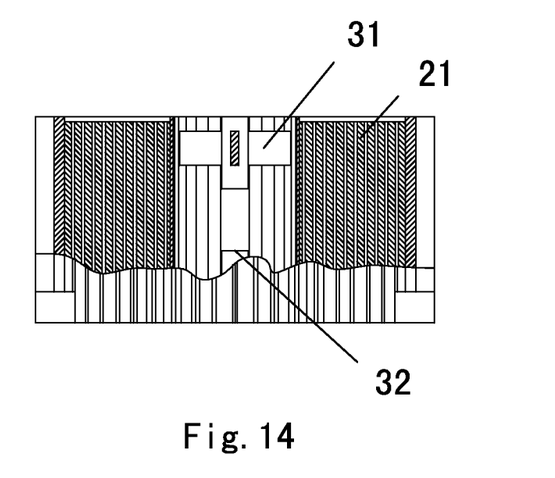
FIG. 14 is a sectional view illustrating the power battery of the present invention according to the fourth embodiment.
Figure 15:
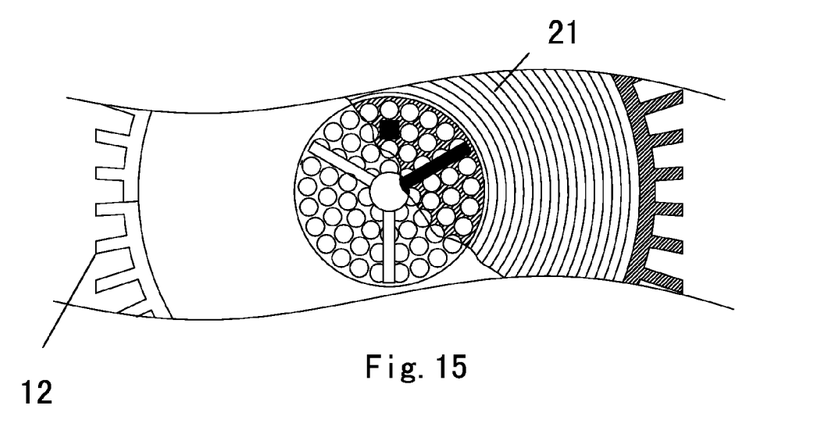
FIG. 15 is a vertical view illustrating the local inner cavity of the power battery of the present invention according to the fourth embodiment.
Figure 16:
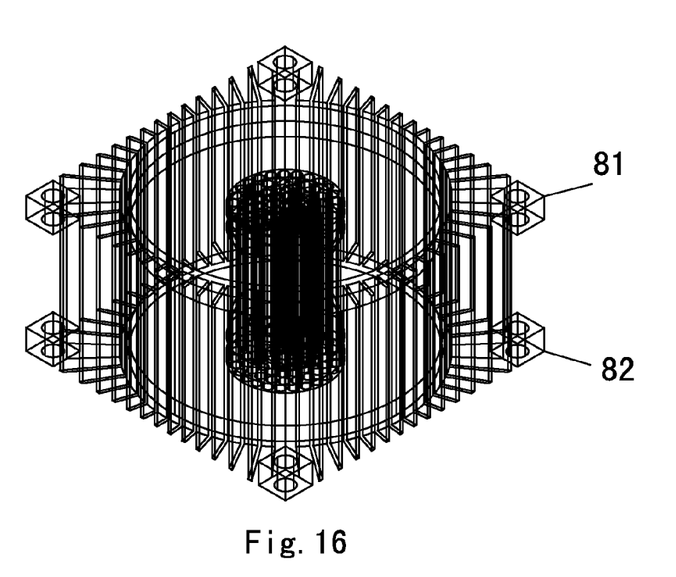
FIG. 16 is a stereogram illustrating the power battery of the present invention according to the fourth embodiment.
Figure 17:
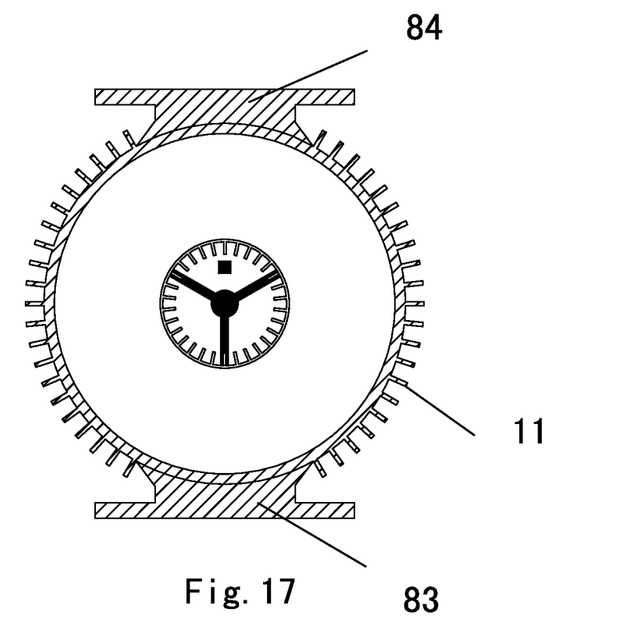
FIG. 17 is a vertical view illustrating the power battery of the present invention according to the fifth embodiment.
Figure 18:
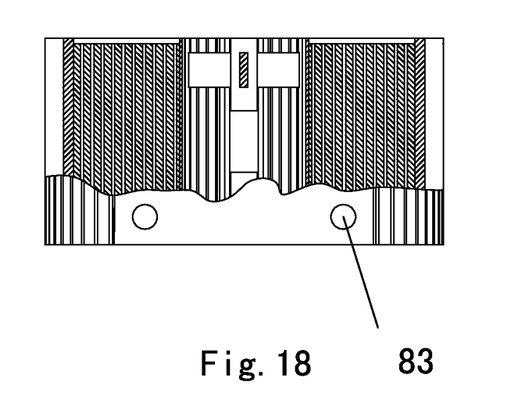
FIG. 18 is a sectional view illustrating the power battery of the present invention according to the fifth embodiment.
Figure 19:
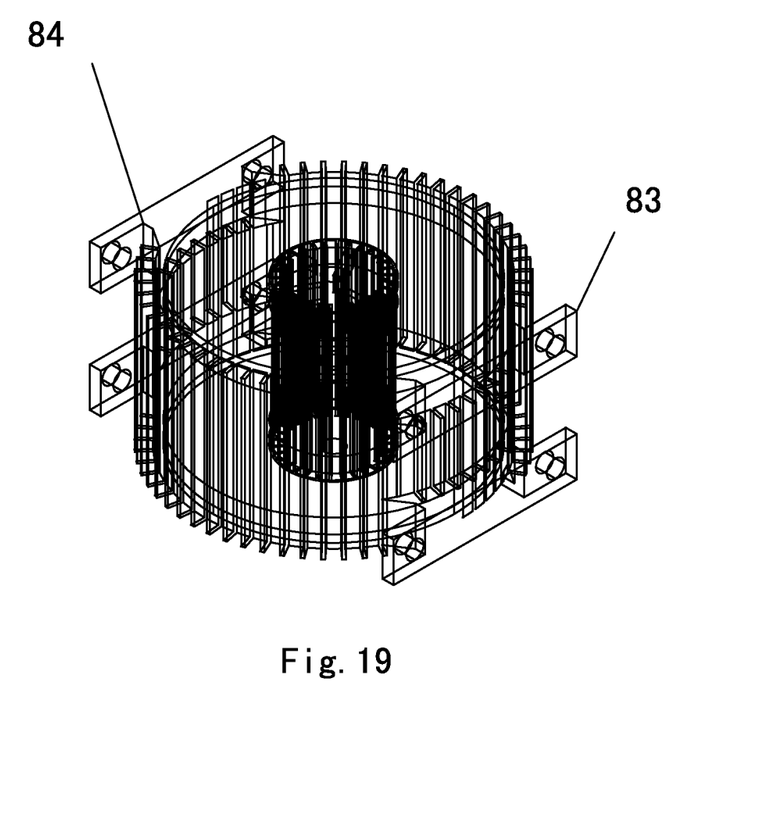
FIG. 19 is a stereogram illustrating the power battery of the present invention according to the fifth embodiment.
Figure 20:
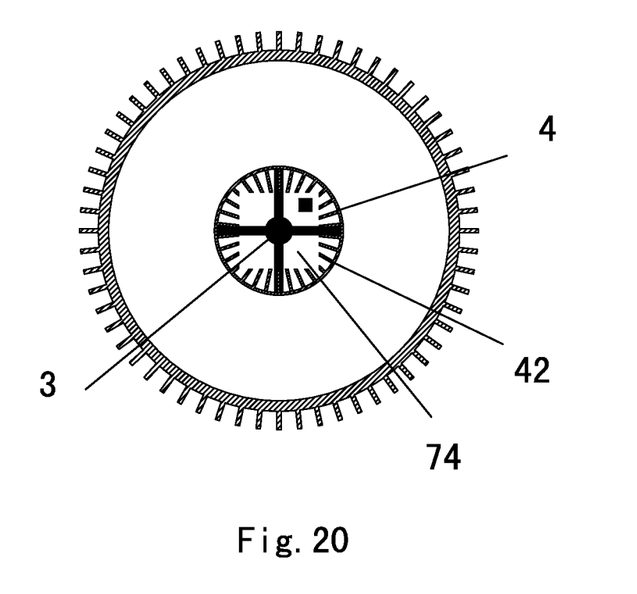
FIG. 20 is a vertical view illustrating the power battery of the present invention according to the sixth embodiment.
Figure 21:
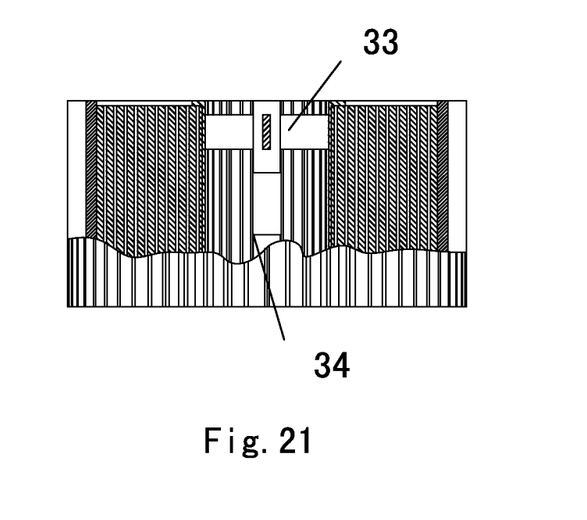
FIG. 21 is a sectional view illustrating the power battery of the present invention according to the sixth embodiment.
Figure 22:
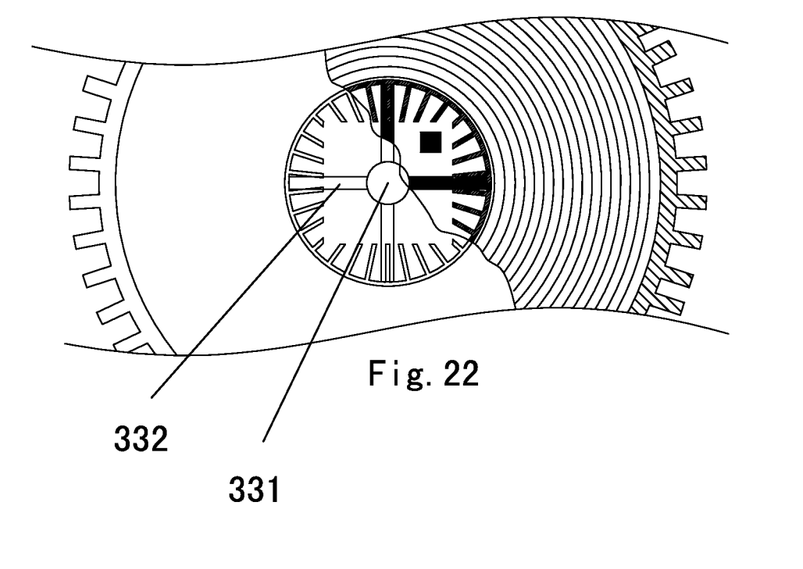
FIG. 22 is a vertical view illustrating the local inner cavity of the power battery of the present invention according to the sixth embodiment.
Figure 23:
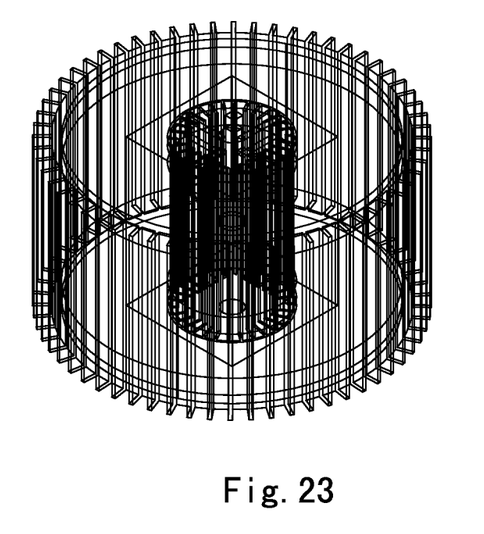
FIG. 23 is a stereogram illustrating the power battery of the present invention according to the sixth embodiment.

As shown in FIGS. 17, 18 and 19, the power battery disclosed in the fifth embodiment differs from the first embodiment in that, front end of the power battery is provided with a front connecting devices 83; back end of the power battery is provided with a back connecting devices 84; the front connecting devices 83 and the back connecting devices 84 are fixed on the outer case 1.

The front connecting devices 83 and the back connecting devices 84 are both provided with mounting holes.

The Sixth Embodiment

As shown in FIGS. 20, 21, 22 and 23, the power battery disclosed in the sixth embodiment differs from the first embodiment in that, the internal heat abstractor is made up of multiple square internal radiator fins 42 which extend inwards in the directions of diameters of the inner case 4; the multiple square internal radiator fins 42 are fixed on the internal surface of the inner case 4 and spaced at a specific distance; benmost contours of the multiple square internal radiator fins 42 are all located on surfaces of a cuboid or a cube to form a cuboid or cube airway 74 wholly.

The electrode 3 comprises a third electrode member 33 and a fourth electrode member 34, which are located at the upper end and the lower end of the inner cavity respectively. The third electrode member 33 comprises one or more electrode poles 332 and a connecting pipe 331 located in the center of the inner cavity.

The power battery disclosed in this embodiment is provided with four electrode poles 332, each of which is connected with the internal surface of the inner case 4 at one end and is connected with the connecting pipe 331 at the other end. The four electrode poles 332 are distributed evenly along a circum on the internal surface of the inner case 4, which makes the power battery be charged and discharge more evenly.

The fourth electrode member 34 has the same structure as the third electrode member 33. The fourth electrode member 34 and the third electrode member 33 are insulated from each other.

The power battery of the present invention has characteristics as follows:

1. Wall thickness of the inner case: the wall thickness of the inner case, which can be regulated according to the power of the power battery, is less than that of the outer case; the wall thickness of the inner case is ranged from 0.2 mm to 15 mm, and the wall thickness of the outer case is ranged from 0.5 mm to 500 mm. The present invention solves the problem of explosion of the power battery due to the heat, which is caused by the high moving ions and cannot be released. Even if an explosion breaks out, the interior energy is released towards the inner cavity and there won't be a destructive effect on surroundings.

2. The sensors inside the inner cavity: the sensors are disposed inside the center of the inner cavity to monitor the temperature or the pressure of the power battery real-timely. For example, when the temperature is too high, the sensor will instruct the air cooling, the water cooling or other cooling material to reduce the temperature of the power battery; when the temperature is too low, the sensor will instruct the warm air heating, the hot water heating or other heating material to keep the temperature of the power battery constant. The power battery operates in proper temperature and ensures stable output voltage and output current, which improves the operating performance and the safety factor of the power battery.

3. Positive electrode and negative electrode: the positive electrode and the negative electrode of the present invention may be disposed in the inner cavity or at any positions of the outside of the power battery according to actual demands. The electrodes are mostly disposed in the inner cavity of the power battery and can't be seen from outside, which ensures the power battery to be aesthetic and prevents the power battery from the influence of the severe environment. The number of the electrode poles is set according to the actual requirements. The electrode poles are disposed in the inner cavity. The number of the electrode poles extracted from each of the positive electrode and the negative electrode is ranged from 2 to 10. The main functions of the electrode poles are to make the power battery be charged and discharge evenly, to reduce the charging time, and to improve the service life and the operating performance of the power battery.

4. Radiator fins in the inner cavity: the power battery of the present invention is provided with radiator fins in the inner cavity, which may be in various shapes. When the temperature of the power battery rises, the radiator fins release the heat and provide excellent working environment for the power battery with the cooperation of other cooling devices.

5. Structure of the outer case: the outer case of the power battery of the present invention is circular, square or rhombic in shape; radiator fins, and fixing devices which may be installed in different environments, are disposed on the outer case of the power battery.

6. Series power batteries and parallel power batteries: if a number of power batteries are needed to be connected in series and/or in parallel for certain electrical equipment, no power cables can be seen from the outside. The design of the power battery may reduce the influence of the severe environment on the power battery greatly.

The preferred embodiments described above are not restricted. It will be understood by those skilled in the art that various modifications and changes may be made therein without departing from the scope of the invention.

What is claimed is:

1. A power battery, comprising an outer case, an electrode and a battery body which comprises electrode plates and an inner case; wherein: the power battery is a unit battery; the power battery is provided with only one inner case and only one outer case; an external heat abstractor is disposed on external surface of the outer case and an internal heat abstractor is disposed on internal surface of the inner case; a cylindrical holding cavity with an annular cross section is formed between the outer case and the inner case, and the electrode plates are provided in the holding cavity and are arranged in layers along a radial direction of the holding cavity; each layer of the electrode plates surrounds the inner case and the electrode is disposed in an inner cavity of the inner case, which is provided with an airway going through the inner cavity;

the airway has a honeycomb-like cross section and is composed of multiple small cylindrical honeycomb holes which are not interconnected;

the electrode comprises a first electrode member and a second electrode member which are located at upper end and lower end of the inner cavity respectively; the first electrode member comprises more than one electrode poles and a connecting pipe located in center of the inner cavity; each of the electrode poles is directly connected and contacts with the internal surface of the inner case at one end, and is directly connected and contacts with the connecting pipe at the other end; the electrode poles are distributed evenly along a circumference on the internal surface of the inner case; the second electrode member has the same structure as the first electrode member; and the first electrode member and the second electrode member are insulated from each other;

the outer heat abstractor made up of multiple square external radiator fins, which extend outwards in the directions of diameters of the outer case; the multiple square external radiator fins are fixed on the external surface of the outer case and spaced at a specific distance; outmost contours of the multiple square external radiator fins are all located on surfaces of a cuboid or a cube; and the whole battery is cuboid or cube in shape.

2. The power battery according to claim 1, wherein: wall thickness of the outer case is greater than that of the inner case.

3. The power battery according to claim 2, wherein: the outer case and the inner case are nested together to form a tubular structure; the holding cavity has a cylindrical structure with an annular cross section; the electrode plates of the battery body are rolled to form overlapped and sliced cylinders; the internal heat abstractor is made up of multiple internal radiator fins which extend inwards in directions of diameters of the inner case; and the multiple internal radiator fins are fixed on internal surface of the inner case and spaced at a specific distance.

4. The power battery according to claim 1, wherein: one or more sensors are disposed inside the inner cavity.

5. The power battery according to claim 1, wherein: wall thickness of the outer case is ranged from 0.5 mm to 500 mm; and wall thickness of the inner case is ranged from 0.2 mm to 15 mm.

6. The power battery according to claim 1, wherein a wall thickness of each small honeycomb hole is ranged from 0.5 mm to 1.0 mm.

\* \* \* \* \*